April 29, 1924.
J. SCHULZ
ANTIFRICTION BEARINGS IN SPLIT MOTORS
Filed Dec. 19, 1923
1,492,108
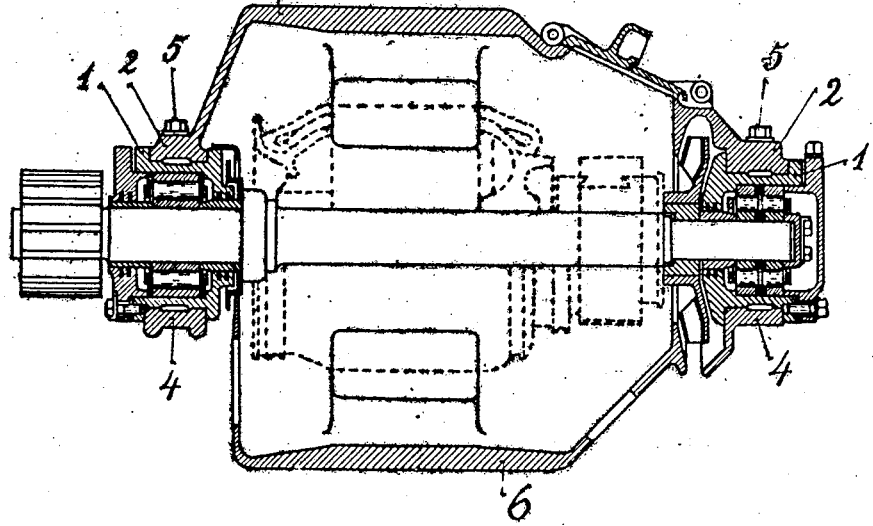
Fig. I.
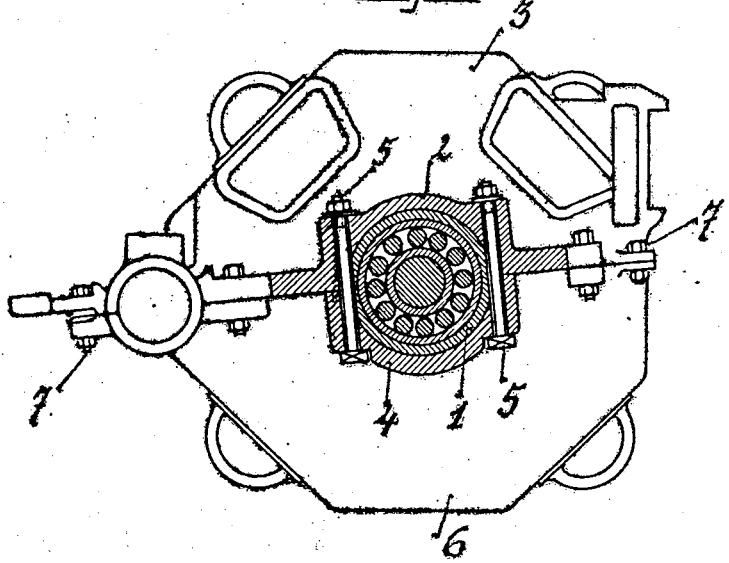
Fig. II.
Inventor
Johannes Schulz
By
Pennie, Davis, ——— ————
Attorneys Patented Apr. 29, 1924.

1,492,108

UNITED STATES PATENT OFFICE.

JOHANNES SCHULZ, OF ELBERFELD, GERMANY, ASSIGNOR TO THE FIRM G. & J. JAEGER, AKTIENGESELLSCHAFT, OF ELBERFELD, GERMANY.

ANTIFRICTION BEARINGS IN SPLIT MOTORS.

Application filed December 19, 1923. Serial No. 681,481.

*To all whom it may concern:*

Be it known that I, JOHANNES SCHULZ, a citizen of Germany, residing at Elberfeld, Germany, have invented certain new and useful Improvements in Antifriction Bearings in Split Motors, of which the following is a specification.

Antifriction bearings in split railway motors have heretofore been mounted in bearing housings, which were attached, by means of horizontal screws in the upper and lower halves of the motor frame.

In view of the fact that the bearing loads, which were transmitted through the bearing housings to the two halves of the motor frame, change their direction with the direction of rotation of the motor, forces occurred, which had the tendency to force the two halves of the motor frame apart. These two halves were therefore permanently subjected to a breathing motion, near said roller bearing housings, which would produce pulsating shearing stresses in the horizontal screws, holding the bearing housing against the frame. The threads of said screws would suffer under these stresses to such an extent that they would loosen after a comparatively short period of service. It has therefore already been suggested to relieve these screws by means of ring shaped ribs in the bearing housings. It has however been found, that the latter, as well as the corresponding grooves in the split frame, lose their circular shape and the necessary rigid support of the armature is thereby jeopardized. This arrangement has the further drawback that, in case of necessary repairs, it is extremely difficult to remove the lower half of the motor frame or the armature, because the horizontal bearing housing screws are difficult to reach from the pit, particularly in the case of narrow gage railway cars, where the clearances are extremely limited. In such cases it is often necessary to remove said screws from the inside of the car.

According to the invention, these drawbacks are all eliminated by the location of the antifriction bearing in the cylindrical housings, which are fastened to the upper half of the frame by means of vertical screws, which can easily be screwed in and locked from the pit, so that all loads, to which the antifriction bearings are subjected, are transmitted to said upper half of the frame.

Figure I of the drawing represents a longitudinal section through a split motor with such an arrangement of the antifriction bearings, while.

Figure II represents a cross section of same.

The antifriction bearings are mounted in cylindrical housings 1, which, in the pinion as well as the collector side, rest in bearing supports 2 of the upper frame 3 and are held against said support by means of the bearing holder 4 which is rigidly screwed against the upper half of the motor frame by means of two vertical screws 5. The antifriction bearings have thus no connection with the lower half of the frame and the occurring downward loads are transmitted exclusively to the upper half 6 of the motor frame through the screws 5.

For inspection of the motor from the pit, it is sufficient to loosen the vertical screws 7, in order to remove the lower half of the frame and to loosen the screws 5, in order to remove the armature and the roller bearings.

I claim:

1. In combination with a horizontal electromotor, a split frame comprising upper and lower portions, the upper portion projecting beyond the lower portion in a direction longitudinal with the armature shaft, and housings enclosing the bearings for the armature shaft and detachably secured to the projecting ends of the upper frame portion.

2. In combination with a horizontal electromotor, a split frame comprising upper and lower portions, the upper portion projecting beyond the lower portion in a direction longitudinal with the armature shaft, and housings enclosing the bearings for the armature shaft and detachably secured to the projecting end portions of the upper frame portion by vertical securing means.

3. In combination with a horizontal electromotor, a split frame comprising upper and lower portions, the upper portion projecting beyond the lower portion in a direction longitudinal with the armature shaft, and housings enclosing the bearings for the armature shaft and detachably secured to the projecting ends of the upper frame portion and accessible without disturbing the lower frame portion.

In testimony whereof, I affix my signature.

JOHANNES SCHULZ.